United States Patent
Shah et al.

(10) Patent No.: US 7,464,408 B1
(45) Date of Patent: Dec. 9, 2008

(54) DAMAGE CONTAINMENT BY TRANSLATION

(75) Inventors: Bakul Shah, Los Altos, CA (US); Rosen Sharma, Los Gatos, CA (US); Peter Haight, El Cerrito, CA (US)

(73) Assignee: Solidcore Systems, Inc., Cupertino, CA (US)

( * ) Notice: Subject to any disclaimer, the term of this patent is extended or adjusted under 35 U.S.C. 154(b) by 1115 days.

(21) Appl. No.: 10/651,588

(22) Filed: Aug. 29, 2003

(51) Int. Cl.
*G06F 21/00* (2006.01)

(52) U.S. Cl. ........................................ 726/22
(58) Field of Classification Search ............... 726/22
See application file for complete search history.

(56) References Cited

U.S. PATENT DOCUMENTS

| | | | |
|---|---|---|---|
| 4,688,169 A | 8/1987 | Joshi | 364/200 |
| 4,982,430 A | 1/1991 | Frezza et al. | 380/50 |
| 5,222,134 A | 6/1993 | Waite et al. | 380/4 |
| 5,390,314 A | 2/1995 | Swanson | 395/500 |
| 5,521,849 A * | 5/1996 | Adelson et al. | 702/119 |
| 5,560,008 A | 9/1996 | Johnson et al. | 395/650 |
| 5,699,513 A | 12/1997 | Feigen et al. | 395/187.01 |
| 5,778,349 A * | 7/1998 | Okonogi | 707/1 |
| 5,842,017 A | 11/1998 | Hookway et al. | 395/707 |
| 5,907,709 A | 5/1999 | Cantey et al. | 395/705 |
| 6,275,938 B1 * | 8/2001 | Bond et al. | 726/23 |
| 6,356,957 B2 | 3/2002 | Sanchez, II et al. | 709/328 |
| 6,393,465 B2 | 5/2002 | Leeds | 709/207 |
| 6,442,686 B1 | 8/2002 | McArdle et al. | 713/151 |
| 6,587,877 B1 | 7/2003 | Douglis et al. | 709/224 |
| 6,769,115 B1 * | 7/2004 | Oldman | 717/126 |
| 6,832,227 B2 * | 12/2004 | Seki et al. | 707/101 |
| 6,988,101 B2 * | 1/2006 | Ham et al. | 707/10 |
| 7,082,456 B2 | 7/2006 | Mani-Meitav et al. | 709/203 |
| 7,139,916 B2 | 11/2006 | Billingsley et al. | 713/182 |
| 2003/0073894 A1 | 4/2003 | Chiang et al. | 600/407 |
| 2003/0074552 A1 | 4/2003 | Olkin et al. | 713/150 |
| 2003/0120811 A1 | 6/2003 | Hanson et al. | 709/245 |
| 2003/0120935 A1 * | 6/2003 | Teal et al. | 713/188 |
| 2004/0015554 A1 | 1/2004 | Wilson | 709/206 |
| 2004/0051736 A1 | 3/2004 | Daniell | 345/752 |
| 2004/0230963 A1 | 11/2004 | Rothman et al. | 717/168 |
| 2004/0255161 A1 * | 12/2004 | Cavanaugh | 713/201 |
| 2005/0018651 A1 * | 1/2005 | Yan et al. | 370/352 |
| 2005/0228990 A1 * | 10/2005 | Kato et al. | 713/167 |

OTHER PUBLICATIONS

Kurt Gutzmann, "Access Control and Session Management in the HTTP Environment," Jan./Feb. 2001, pp. 26-35, IEEE Internet Computing.

* cited by examiner

*Primary Examiner*—Matthew B Smithers
(74) *Attorney, Agent, or Firm*—Haverstock & Owens LLP

(57) ABSTRACT

Interface elements of a logic module are translated by renaming, adding dummy elements, and/or associating traps with dummy elements. Trusted parties are made aware of renamed interface elements and thereby allowed to properly communicate with logic module. Untrusted parties are kept unaware of the interface translation, with attempts to guess correct interface elements likely to fail, instead resulting in communication attempts with dummy elements and subsequent trapping of the untrusted parties.

29 Claims, 9 Drawing Sheets

DAMAGE CONTAINMENT BY TRANSLATION

BACKGROUND

1. Field

Invention relates to containment of damages to computing resources, and in particular to containment of damages originating from untrusted or malicious logic modules such as viruses.

2. Related Art

An improperly guarded provider module, such as a software module providing a service or a resource, can be taken over by an untrusted user module, such as a virus. Such an untrusted user module may cause considerable damage by using system resources, by accessing and/or corrupting the provider module's data, by copying itself to other machines, and so on. Hence, it is desirable to contain the untrusted user module and limit its destruction to the extent possible.

An ideal solution would ensure a logic module's immunity to such attacks. However, as logic modules become increasingly complex, such immunity is increasingly difficult to accomplish. Furthermore, it is impossible to fully audit third party modules (such as software applications and shared libraries) and verify that they are immune to attacks from untrusted parties. Every new module and every change in existing modules must be similarly inspected, with the risk of allowing attacks in case such an inspection is not thoroughly exhaustive. Such an inspection process, even if possible, will consume large amounts of resources and time and typically will not be performed except in a highly secure environment.

A second option is to operate a provider module in a sandbox and provide no more resources than the provider module needs, thereby confining threats to the provided resources. However, such resources may still be critical and are vulnerable to considerable damages.

Accordingly, there is a need for stronger means of damage containment.

SUMMARY

Interface elements of a provider module are translated by renaming, by adding dummy elements, and/or by associating traps with dummy elements. Trusted user modules are made aware of renamed interface elements and are thereby allowed to properly communicate with the provider module. Untrusted user modules are kept unaware of the interface translation and their attempts to guess the correct interface elements are likely to fail, instead resulting in communication attempts with dummy elements and the subsequent trapping of the untrusted user modules. Where possible, a large number of dummy elements are introduced in order to significantly increase the probability of trapping untrusted user modules.

BRIEF DESCRIPTION OF DRAWINGS

FIG. 4b-1 is a diagram illustrating an untranslated provider interface.

FIG. 4b-2 is a diagram illustrating a translated provider interface serving as a "wrapper" around an untranslated provider interface, according to an embodiment of the present invention.

DETAILED DESCRIPTION

Figure 1:
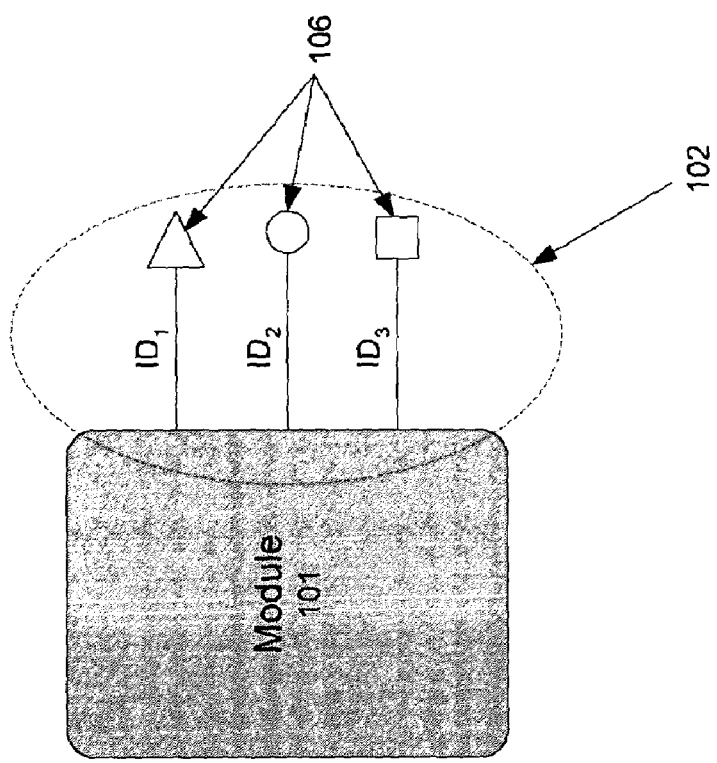
FIG. 1 is a diagram illustrating a provider module interface prior to renaming, according to an embodiment of the present invention.

The following set of definitions serves as a glossary of terms used in the detailed description:

Logic Module
    A hardware or software element implementing one or more logic functions. A logic module may make use of one or more other logic modules to perform and/or implement its functions.

Provider module (hereinafter also referred to as an "implementer module" or "provider")
    A logic module, allowing users to (1) invoke one or more of the provider module's implemented logic functions, and/or to (2) accept any results from such logic functions. Access to and/or interaction with the provider module are provided via an interface to the provider module and are dependent on the type of the provider module.

Provider module interface (hereinafter also referred to as "provider interface" or "interface")
    A set of elements for accessing logic functions of a provider module and/or for interacting with a provider module. A user of a provider module invokes one or more elements of the provider module interface to cause the provider module to perform corresponding action. A provider module may provide different interfaces for different classes of users.

User module
    Any user of a provider interface, accessing and/or interacting with a provider module via the interface. A user module may be a logic module, another provider module or a human being.

Software module
    A software logic module; may be a provider module or a user module.

Hardware processor
    A provider module that provides a set of instructions as an interface to access its logic functions. These instructions implement a set of basic logic building block operations with which a very large set of algorithms can be implemented.

Computer System
A system comprising memory, processor and input/output devices. A computer system may be a general purpose computer or a computer used for a specific function such as printing, communication, controlling physical devices and so on. A computer system may be a provider module, or a user module, or both.

Communication network
A network for logic modules such as computer systems to communicate with each other.

Communication protocol
A set of rules to organize a particular kind of communication between two or more parties (such as logic modules). These rules may be standardized (agreed upon by a large set of companies and people) or may be private, known only to the parties communicating.

Program
A software user module that uses the interface provided by a hardware processor to implement its own logic function.

Operating system
A particular kind of program that does not rely on other programs to run and is used to control the resources provided by a computer system. It is also a provider module, providing an interface to other programs (for using system resources) and coordinating requests made by other programs.

Application program
A particular kind of program that makes use of an operating system to perform its function. Typically it implements logic functions for a particular kind of use.

Shared Library
A software module that is shared by one or more application programs.

API (Application Programming Interface)
An interface for use by software modules to access services provided by an operating system or other service provider (such as a database server or a file server).

Web server
An application program that provides an interface to access information on a computer system using the HTTP (Hyper Text Transfer Protocol) communication protocol and/or related protocols. A web server may use other programs to perform its function.

Database server
An application program that provides access for storing, organizing, querying and/or updating of data. A database server may provide access to the data via a standard query language such as SQL (Structured Query Language).

File System
A system for organizing data, comprising a set of files, wherein each file is named and contains some data, and folders or directories which are collections of names that refer to files and other directories or folders.

File system server
An application program or a software module that is part of an operating system and provides access to one or more file systems.

Trusted user module
A trusted user of a provider module. A trusted user makes use of an interface provided by a provider module in the way the interface and the provider module are designed to be used.

Untrusted user module
An untrusted user of a provider module. An untrusted user module may also be embedded in a trusted user. In either case an untrusted user module may make use of the provider module in an unintended manner unintentionally or in order to cause harm to the logic module or to cause harm to a resource via the provider module.

Virus
A logic module that attempts to gain control of a second logic module (for example causing the second logic module to behave in a way that benefits the virus or to behave in an unintended manner) through a badly designed interface or through a third logic module. A virus is an untrusted user module.

FIG. 1 is a diagram illustrating a provider module 101 having a provider interface 102, according to an embodiment of the present invention. Provider interface 102 comprises a set of one or more interface elements 106. Three example interface elements 106 are shown in FIG. 1 and identified by the interface element names $ID_1$, $ID_2$ and $ID_3$.

In one embodiment, provider 101 comprises an operating system (OS), and provider interface 102 comprises a set of system calls provided by the OS for accessing system resources and for operating on such resources, wherein interface elements 106 comprise individual system call identifiers (names) (such as system call numbers serving as indices into a vector of system calls, or other identifiers indicating system calls). In order to prevent an untrusted user module from accessing system resources, the untrusted user module is prevented from making system calls, as follows.

Figure 2:
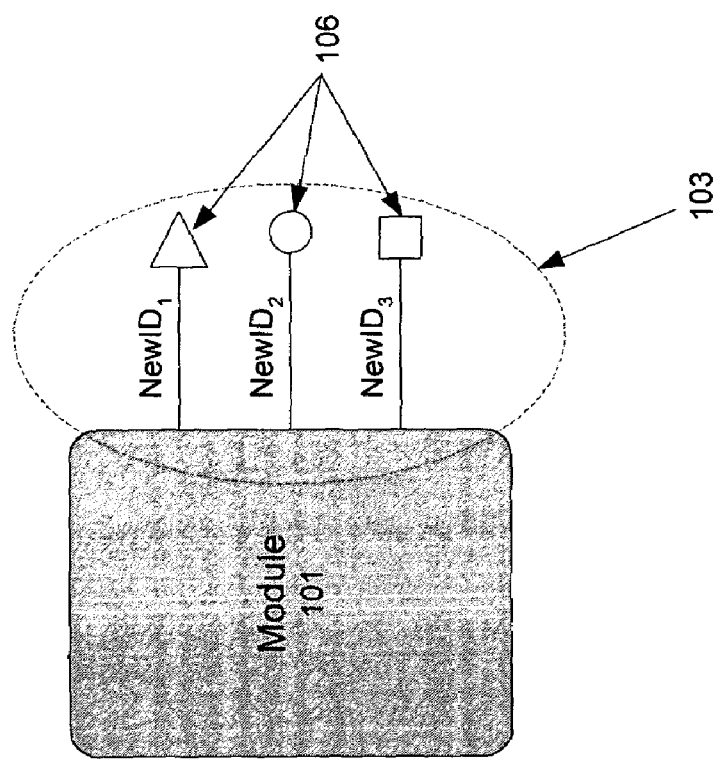
FIG. 2 is a diagram illustrating a provider module interface after renaming, according to an embodiment of the present invention.

First, existing system call names are translated (renamed), wherein the new names are kept secret from untrusted user modules. FIG. 2 is a diagram illustrating a provider interface 103 after a renaming of the interface elements 106, according to an embodiment of the present invention. Provider interface 103 results from renaming the interface elements 106 of the original provider interface 102, changing the original names $ID_1$, $ID_2$ and $ID_3$ to the new names $newID_1$, $newID_2$ and $newID_3$. The new names are randomly generated and assigned, and/or are assigned using a mathematical function such as a hash function (wherein the original names are hashed to a set of new names), and/or by adding an offset to the original names (for example by adding or appending a constant number or string to the numbers or strings representing the original names), or by any other method for renaming a set of original names to a set of new names.

Figure 3:
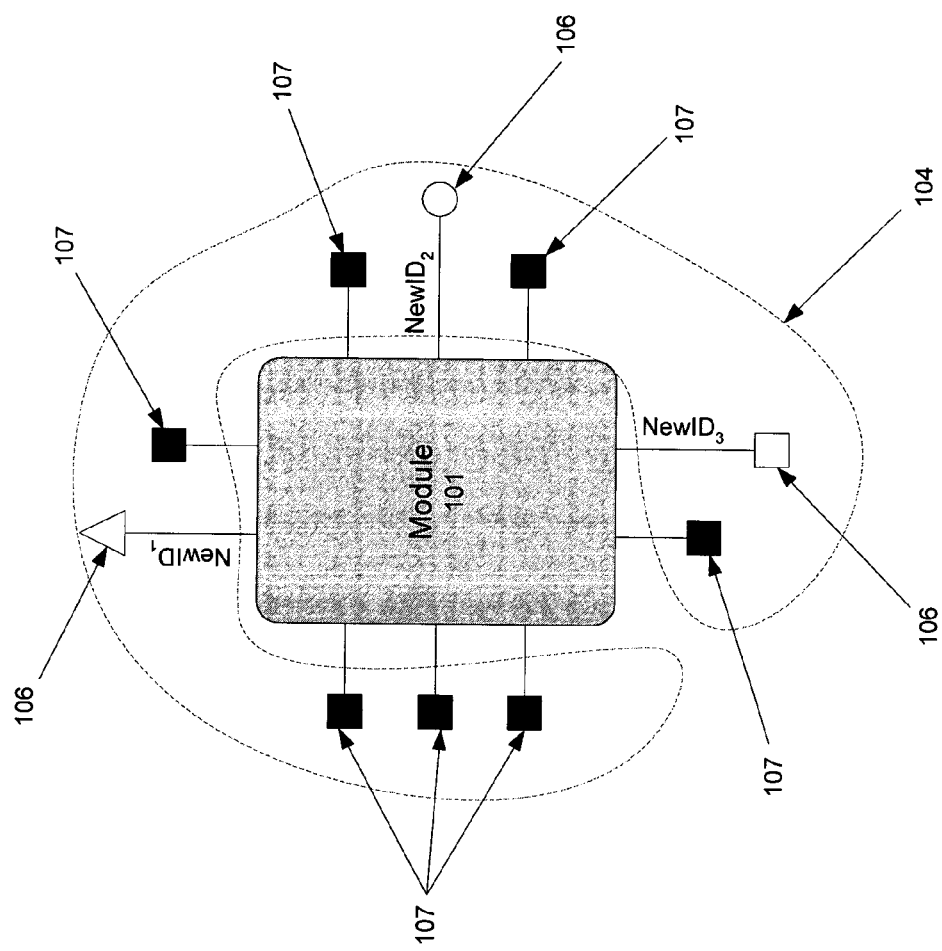
FIG. 3 is a diagram illustrating a provider module interface after renaming and adding dummy elements, according to an embodiment of the present invention.

Second, one or more dummy interface elements 107 are added to the provider interface 103, as shown in FIG. 3 according to an embodiment of the present invention. As a result, an untrusted user module attempting to access a valid interface element 106 simply by guessing the name of such a valid interface element 106 will likely guess incorrectly and instead point to a dummy interface element 107. The larger the proportion of dummy interface elements 107 to valid interface elements 106, the larger the likelihood that such an untrusted user module, unaware of the particular renaming of the provider module interface 103, will point to a dummy interface element 107 (as a result of false guessing) instead of pointing to an intended valid interface element 106. For example, dummy interface elements 107 may be added to a set of system calls of an operating system simply by changing individual system call numbers to different values and leaving "holes" in between such system call numbers, wherein the holes come to represent sets of dummy interface elements 107.

Figure 4A:
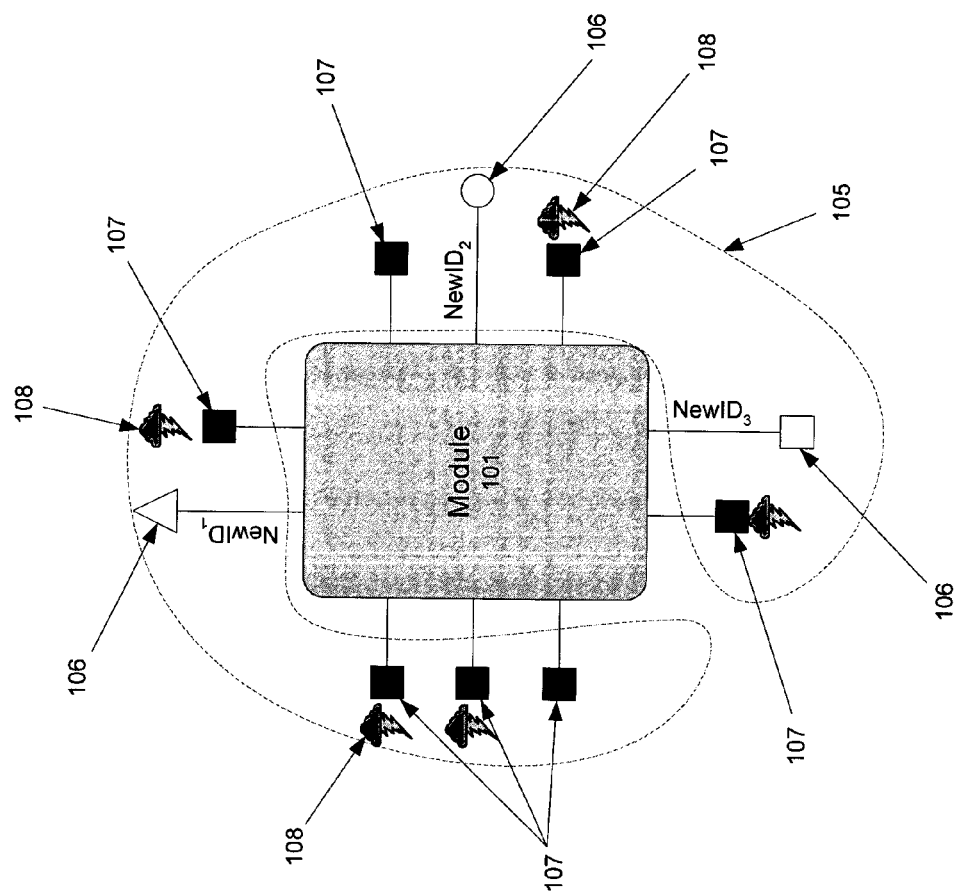
FIG. 4a is a diagram illustrating a provider module interface after renaming, adding dummy elements and adding dummy element traps, according to an embodiment of the present invention.

Third, "traps" 108 are associated with one or more of the dummy interface elements 107, resulting in a provider interface 105 as shown in FIG. 4a according to an embodiment of the present invention. A trap 108 is a mechanism that triggers the disabling or termination of a user module if the user module attempts to access a dummy interface element 107 endowed with such a trap 108. An attempt to access a dummy element 107 which is not endowed with a trap 108 is ignored. For example, if an untrusted user module, such as a malicious software application or a software application taken over by a virus, attempts to guess a system call (i.e. a valid interface element 106) but instead points to a dummy interface 107 endowed with a trap 108, the application can be terminated and/or disabled by the OS and/or the system administrator alerted of the intrusion.

It is contemplated that the above three provider interface translation steps need not necessarily be performed in said order, but may be performed independently or in combination, and in different sequence.

Figures 2, 4B:
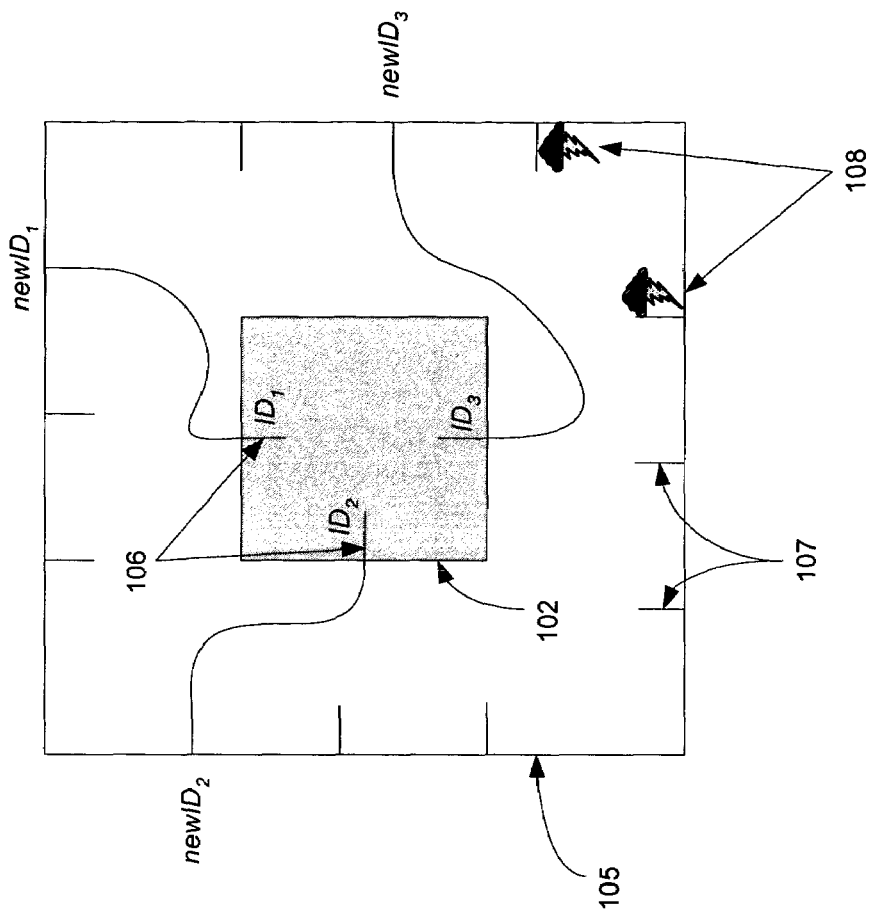
Figures 1, 4B:
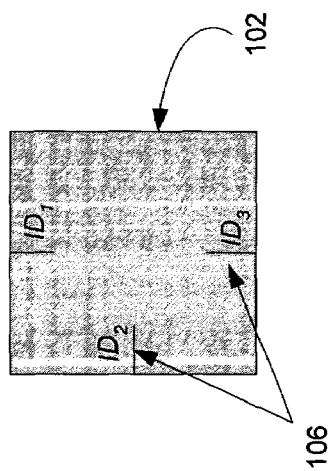

The translation of a provider interface 102 can be thought of as adding a "wrapper" to the provider, as shown in FIGS. 4b-1 and 4b-2. As shown in FIG. 4b-1, an untranslated provider interface 102 exposes the interface elements 106 provider 102. FIG. 4b-2 shows the translated provider interface 105 as a wrapper around the untranslated interface 102. The valid elements 106 of the wrapper interface 105 are properly mapped to the elements 106 of the untranslated interface 102, while the dummy elements 107 of the wrapper interface 105 either trap accessors or do not work at all.

Among the benefits of disallowing an untrusted user module, such as a software application, to make system calls are the following:

- Such an untrusted user module can not make system calls to allocate & control system resources such as processors and/or main memory and/or IO (Input/Output).
- Such an untrusted user module cannot make new network connections or communicate over existing network connections;
- Such an untrusted user module cannot snoop around on the local hardware;
- Such an untrusted user module cannot use system calls to respond to "keep-alive" messages or queries about its health and thus will be easier to detect.

Translation of a provider interface 102 into a new provider interface 105 necessitates that trusted user modules accessing and/or interacting with the translated provider interface 105 be made aware of the translation, while untrusted user modules be kept unaware of the translation.

For example, in the system call translation described above, while preventing untrusted user modules from making systems calls, trusted user modules are made aware of the proper names of valid system calls. Therefore, a trusted user module is translated in accordance with the particular translation of the set of system calls. For example, an executable code representing a trusted user module is translated such that system calls within the executable code referencing old system call names are replaced with system calls in the executable code referencing the new system call names according to the particular translation of the set of system calls applied to the OS. Such translation of a trusted user module ensures proper operation of the trusted user module within the environment of the translated provider interface (i.e. the translated set of system calls).

It is an advantageous aspect of the present invention that deciphering a translation of one provider interface does not provide any advantage in deciphering a different translation of another provider interface, as long as the translations are different, even if the provider modules are otherwise similar or even identical. For example, in the system call translation described above, the system call translation can be unique to each individual copy of the OS, such that breaking the translation on one copy of an OS does not provide any advantage in breaking a different translation on a different copy of the OS.

Figure 5:
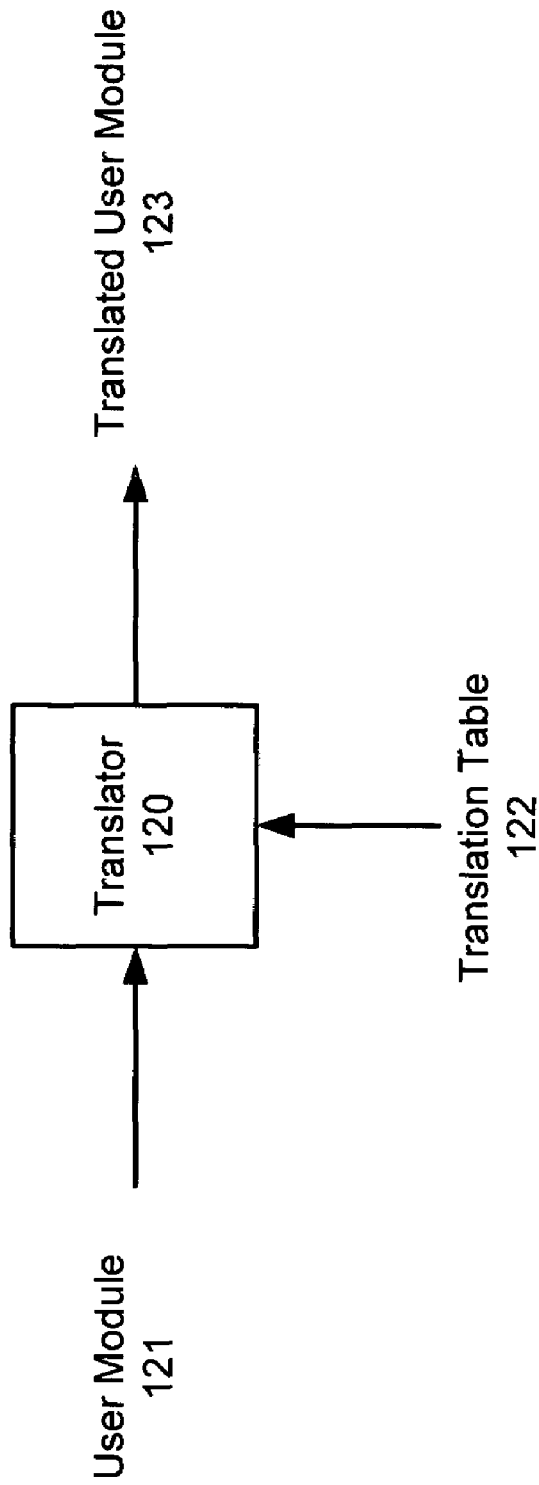
FIG. 5 is a diagram illustrating a translator, according to an embodiment of the present invention.

FIG. 5 is a diagram illustrating a translator, according to an embodiment of the present invention. Translator 120 takes as input a (trusted) user module 121 and a translation table 122, wherein the translation table 122 describes a mapping between a set of original provider interface element 106 names (of an untranslated provider interface 102) to a set of new provider interface element 106 names (of a translated provider interface 105). Translator 120 produces as output a user module 123 in which the references to the original provider interface element 106 names are replaced with references to the new interface element 106 names according to the translation table 122. The translated trusted user module 123 can then operate in an environment comprising the provider 101 with a translated provider interface 105. In one embodiment, translator 120 runs locally on provider 101. In an alternative embodiment, translator 120 does not run locally, but runs on a different system. It is contemplated that the translation need not necessarily be specified in the form of a table, but instead can be indicated using a more compressed code, such as a hash function of other mathematical function.

Figure 6B:
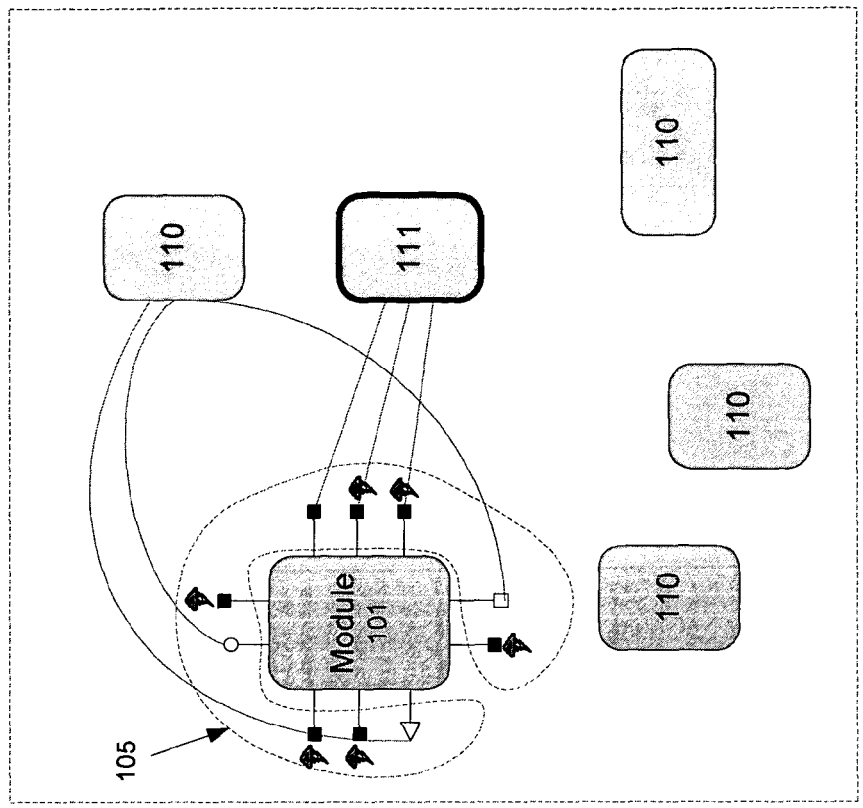
FIG. 6b is a diagram illustrating a provider module with a translated provider interface among translated trusted user modules and an untrusted user module, according to an embodiment of the present invention.
Figure 6A:
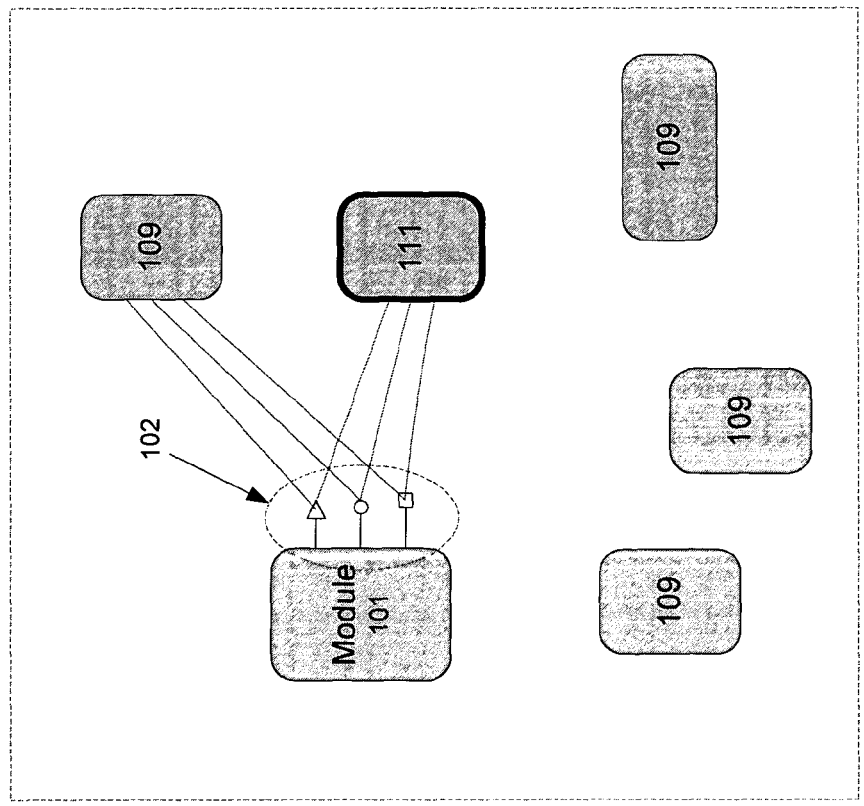
FIG. 6a is a diagram illustrating a provider module with an untranslated provider interface among trusted user modules and an untrusted user module.

FIG. 6a is a diagram illustrating a provider 101 with an untranslated provider interface 102 among trusted user modules 109 and an untrusted user module 111. While trusted user modules 109 have unhindered access to the provider 101 through the untranslated provider interface 102, so does the untrusted user module 111. For example, while trusted software applications have access to the OS through system calls, so does an untrusted software application.

FIG. 6b is a diagram illustrating a provider 101 with a translated provider interface 105 among translated trusted user modules 110 and an untrusted user module 111, according to an embodiment of the present invention. The untrusted user module 111 cannot perform any of the intended operations and will likely fall into a trap via the translated provider interface 105, while the translated trusted user modules 110 (which are the translated versions of the trusted user modules 109 shown in FIG. 5a) have access to provider 101, since they are translated in accordance with the translation of the provider interface 105. For example, while an untrusted software application is prevented access to the OS through the translated set of system calls, the translated trusted applications have access to the OS through the translated set of system calls.

It is useful to store (on a disk or other computer-readable media) a copy of the untranslated provider 101 (for example OS code) as well as a copy of the untranslated user modules, in case a patch is to be applied to the provider 101 after the provider interface has undergone the above described translation. In such a case, the patch is applied to the untranslated provider 101, and the interface 102 of the patched provider 101 is translated as described above. Trusted user modules are also translated, in accordance with said translation of the interface of the patched provider 101.

Other alternative embodiments of the present invention are contemplated as described below.

In one embodiment of the present invention, provider 101 comprises a shared software library, and provider interface 102 comprises a set of exported functions of the shared library. Optionally, the shared library operates on top of a translated set of OS system calls, thereby representing a user of the provider OS, and therefore is translated according to the translated set of OS system calls. The shared library interface 102 is translated, resulting in a shared library interface 105 comprising renamed exported functions and dummy shared library functions added to trap untrusted callers. In this embodiment, in order to translate a software user module operating on top of the translated set of OS system calls as well as linking with the shared library, the software user module is (1) translated according to the translation of the set of OS system calls as well as (2) translated according to the translation of the shared library interface. Alternatively, if the software user module accesses the shared library but does not make any direct OS system calls, the translation of the software user module need not take into account the translation of the OS, and the software user module can be translated according to the shared library interface translation only. In general, in system comprising a set of one or more translated provider interfaces (such as a protected shared library) as well as a set of one or more untranslated provider interfaces (such as an unprotected shared library), a software user module may selectively access one or more providers as long as the software user module is translated according to the translated provider interfaces which the software user module intends to access.

In one embodiment, provider 101 comprises a hardware processor, provider interface 102 comprises an instruction set of the processor, and translated provider interface 105 comprises a translated instruction set, either (1) with added dummy instructions for trapping untrusted parties, or (2) without any dummy instructions. A program G (for example an OS) comprising instructions for execution on the hardware processor is translated accordingly in order to properly execute using the translated instruction set. In a first embodiment, the hardware processor comprises a table for storing the translation between the old instruction set and the new instruction set. The hardware processor decodes fetched translated instructions back to native (i.e. untranslated) instructions for execution according to the translation table. Employing such a translation table allows for dynamically changing the translation on a given hardware processor, as well as allowing different translations on different processors. In a second embodiment, the decoding of the fetched translated instructions is delegated outside of the hardware processor, for example to a memory element, allowing the hardware processor to operate without being altered to accommodate for the translation and decoding. In this embodiment, the memory element distinguishes between fetched instructions (which are then decoded to the hardware processor's native instructions) and fetched data (which need not be decoded). The memory element comprises a translation table for translation of fetched instructions.

In one embodiment, provider 101 comprises a web server, and provider interface 102 comprises a set of one or more URLs (Unique Resource Locators) served by the web server. The translated provider interface 105 comprises a translation of the original served URLs, for example via a one-to-one mapping (i.e. translation) of the original URLs to a set of random strings, wherein the translation is given for example by a URL translation table or a URL hashing function. The web server serves the translated URLs to a browser and decodes requested URLs internally according to the particular translation used. In the case of (untranslated) URLs containing one or more parameters entered at the browser, the web server translates the pathname portion and/or the parameter names (if any) of the URLs. This embodiment protects against untrusted (or malicious) rewriting of a URL at the browser side, a common attack with a goal of using knowledge gleaned from the URL syntax to access and/or corrupt data at the web server side.

In one embodiment, provider 101 comprises a file system, and provider interface 102 comprises a set of file names according to the file system. The set of files of the file system is divided into a set of protected files and a set of unprotected files, and the translated provider interface 105 comprises translated file names (for example according to a file name translation table) for the set of protected files, and original (untranslated) names for the set of unprotected files. Such a file system operates in conjunction with a translated set of OS system calls, and a library function is provided by the OS to (trusted) software user modules for translating a file name. Executables (or other software user modules) running on an OS with such a file system provide a list of translated file names for all the protected files which will be accessed by the executable, which can be accomplished at compile-time and/or link-time using said library function. Upon a file access request by an executable at run time, the OS decodes the file name and determines whether it is a protected file. If the file is unprotected, access is granted. If the file is protected, the OS determines whether the file name appears in the list of files accessed by the executable. If the file name appears in the list, access is granted, otherwise access is denied. Trusted legacy executables which do not provide said list of translated file names can be disassembled to determine names of accessed files, and then stored in the form of a new executable providing said list of translated file names. This legacy transformation is a resource intensive process but can be accomplished in order to secure a system.

In one embodiment, provider 101 comprises a file system, and provider interface 102 comprises a set of default extensions according to the file system. The translated provider interface 105 comprises a translation of the set of default extensions to a new set of extensions. As an example, extensions such as .exe and .bat are translated to .abc and .xyz. A translated extension is decoded by the file system (or the OS) upon file access to ensure proper handling. The translation is inaccessible to untrusted user modules, thereby preventing untrusted user modules from fabricating a file with an extension known to cause the file to behave in a certain way, such as causing a file to be executed, or causing a target application to process the file resulting in data corruption or compromised system security.

In one embodiment, provider 101 comprises a computer system, provider interface 102 comprises a set of communication port identifiers (such as port numbers) of the computer system, and provider interface 105 comprises a translated set of communication port identifiers with added dummy identifiers for trapping untrusted user modules. The computer system advertises the port translation to trusted computer systems communicating with it. Optionally, a trusted notification user module residing on the computer system notifies one or more other trusted notification user modules residing on other computer systems as to the most recent translation. Such a trusted notification user module guides trusted software user modules in communicating with the secured computer system. For example, a mail reader application requests connection to (untranslated) port 25 of a secured mail server computer system, the notification user module translates the request to port 125 of the secured mail server computer system, according to the most recent port translation (translating 25 to 125), and relays the connection request to port 125 of the secured mail server computer system. It is an advantageous aspect of this embodiment that an untrusted user module is discouraged from attempting to improperly communicate with the secured computer system.

In one embodiment, provider 101 comprises a communication network, provider interface 102 comprises a set of protocols for the communication network, and translated provider interface 105 comprises a set of protocols for the communication network, wherein the set of protocol identifiers are translated, and dummy types are added to trap untrusted user modules. For example, the communication network may be a set of nodes communicating via TCP (Transmission Control Protocol) or UDP (User Datagram Protocol) over IP (Internet Protocol) over a MAC (media access control) layer such as Ethernet. In a network packet (for example an Ethernet packet), the identifier in the "type" field indicates the protocol governing the packet datagram (such as indicating the IP protocol), and within the packet datagram, the identifier within the "protocol type" field indicates the protocol governing the packet datagram (such as indicating the TCP protocol or the UDP protocol). In this example, translated provider interface 105 comprises translated identifiers for the described "protocol type" fields (for example as indicated by a protocol type translation table), and trusted user modules as well as trusted drivers on routers, switches and/or network interface cards are made aware of the translation, enabling decoding of the intended protocols and resulting in proper handling and/or routing of the packets according to the intended protocols. It is an advantageous aspect of this embodiment that untrusted user modules remain unaware of the protocol translation and hence are unable to communicate over the communication network.

In one embodiment, provider 101 comprises a database, provider interface 102 comprises a set of SQL keywords and/or commands served by the database, and translated provider interface 105 comprises a set of translated SQL keywords and/or commands served by the database. The database (or a software wrapper around the database) translates the keywords and/or commands to random strings (for example according to a database keyword translation table) and notifies trusted user modules of the translation The database (or software wrapper around the database) decodes keywords and/or command received from user modules back to native (untranslated) keywords, according to the translations used, allowing proper processing of the keywords and/or database commands received from trusted user modules while preventing untrusted user modules from successfully injecting a database command (such as a query or an update) into a database query. In an alternative embodiment, provider interface 102 comprises a set of keywords and/or command in another interpreted language, such as Perl, Python, Java or PHP.

Figure 7A:
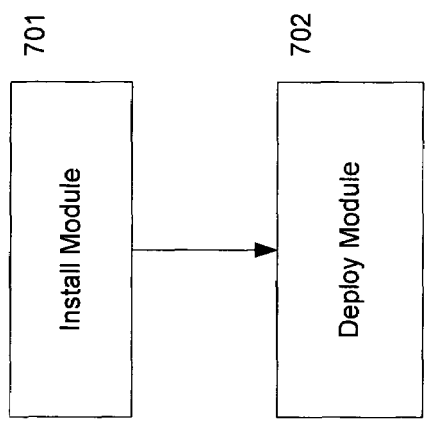
FIG. 7a is a flow diagram illustrating a traditional method for deploying a provider module or a user module.

FIG. 7a is a flow diagram illustrating a traditional method for deploying a provider module or a user module. In the case of a provider module, the provider (for example an OS) is installed 701 and then deployed 702. In the case of a user module, the user module (for example a software application) is installed 701 such that the user module may gain access to one or more provider interfaces, and then deployed 702, wherein the deployment comprises accessing and/or interacting with the one or more providers (such as an OS) through the provider interfaces. This method allows untrusted user modules to access providers, thereby risking damage to provider resources.

Figure 7C:
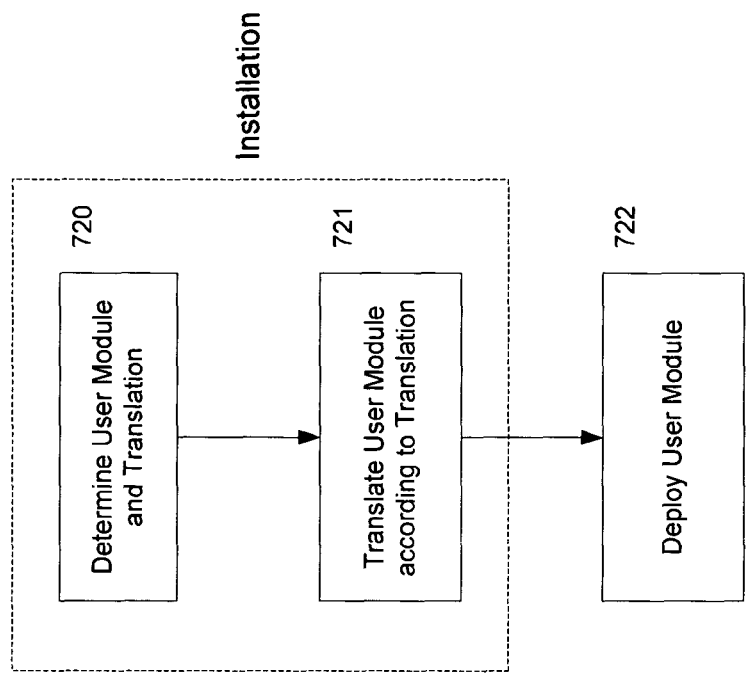
FIG. 7c is a flow diagram illustrating a method for user module translation, according to an embodiment of the present invention.
Figure 7B:
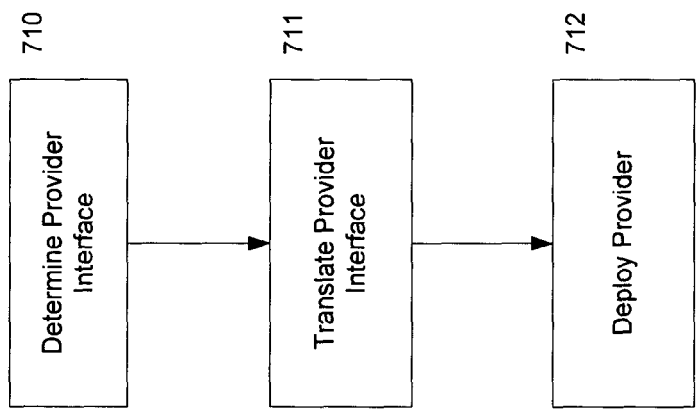
FIG. 7b is a flow diagram illustrating a method for provider translation, according to an embodiment of the present invention.

FIG. 7b is a flow diagram illustrating a method for provider translation, according to an embodiment of the present invention. A provider interface 102 of a provider 101 is determined 710. As one example, the interface 102 is a set of OS system calls, wherein the provider 101 comprises an OS. As another example, the provider interface 102 may be a set of communication port identifiers or a computer system, where the provider 101 is the computer system. Other examples are described above. The provider interface 102 is then translated 711 into a new provider interface 105, wherein the names of the elements 106 of the provider interface 102 are changed arbitrarily and/or randomly, and/or dummy interface elements are added to the new provider interface (optionally with traps 108) in order to prevent untrusted user modules from successfully accessing and/or interacting with provider 101. Having replaced the provider interface 102 with a translated interface 105, provider 101 is now ready for deployment (i.e. ready to be accessed by appropriately translated trusted user modules).

FIG. 7c is a flow diagram illustrating a method for user module translation, according to an embodiment of the present invention. A user module and a translation are determined 720, the user module for accessing and/or interacting with a provider 101 through the translated provider interface 105, and wherein the determined translation corresponds to the translated provider interface 105. The user module is translated 721 according to said determined translation, enabling the user module to access and/or interact with provider 101 using the translated provider interface 105. As an example, the provider 101 is an OS having a translated interface 105 comprising a translated set of system calls, and the user module is a software application for running on the translated OS. Details of this and other examples are described above.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A computer-assisted method for translating a logic module interface, comprising the steps of:

determining a first interface of a logic module, the first interface having a first one or more interface element names; and generating a second interface of the logic module, the second interface having a second one or more interface element names;

wherein the generating step comprises renaming the first one or more interface element names to produce the second one or more interface element names.

2. The method of claim 1, wherein the renaming step comprises generating one, or more random strings as the second one or more interface element names.

3. The method of claim 1, wherein the renaming step comprises hashing the first one or more interface element names.

4. The method of claim 1, wherein the renaming step comprises adding an offset to the first one or more interface element names.

5. The method of claim 1, wherein the generating step further comprises adding one or more dummy interface elements to the second interface.

6. The method of claim 5, wherein the generating step further comprises associating one or more traps with the one or more dummy interface elements.

7. The method of claim 1, wherein the logic module comprises an operating system and the first interface comprises a set of system calls of the operating system.

8. A computer-assisted method for translating a user module, comprising the steps of:
- determining a first user module and a translation, the translation mapping a first provider interface to a second provider interface; and
- generating a second user module according to the translation;
- wherein the generating step comprises replacing a first reference in the first user module to an element in the first provider interface with a second reference to an element in the second provider interface according to the translation.

9. The method of claim 8, wherein the first provider interface comprises a set of system calls of an operating system, the second provider interface comprises a translated set of system calls of the operating system, the first user module comprises a software application referencing the first provider interface, and the second user module comprises a translated software application referencing the second provider interface.

10. A computer system, comprising:
- an operating system;
- a processing module, wherein the processing module is running the operating system;
- a first set of one or more system calls to the operating system for disclosing to trusted software modules; and
- a second set of one or more dummy systems calls to the operating system for trapping untrusted software modules.

11. The computer system of claim 10, wherein the untrusted software module is disabled after a reference to any one or more of the second set of one or more dummy systems calls.

12. The computer system of claim 10, wherein the operating system generates a system administrator alert after reference to any one or more of the second set of one or more dummy systems calls.

13. The computer system of claim 10, wherein the operating system generates an event log after reference to any one or more of the second set of one or more dummy systems calls.

14. A computer system comprising: a processing module; a software program; and an operating system; the software program configured for running on the operating system, the operating system having a translated system call interface, the translated system call interface comprising a first set of translated system call names for disclosing to trusted parties, the translated system call interface further comprising a second set of dummy system call names untranslated system call names for trapping entrusted parties, the software program comprising:
- a set of one or more instructions;
- wherein the set of one or more instructions comprises one or more references to the first set of translated system call names.

15. The computer system of claim 14, wherein a second software program is disabled after the second software program references any one the second set of dummy system call name untranslated system call names.

16. The computer system of claim 14, wherein the operating system generates a log event after a reference to any one or more of the second set of dummy system call name untranslated system call names.

17. The computer system of claim 14, wherein the operating system generates a system administrator alert after reference to any one or more of the second set of dummy system call name untranslated system call names.

18. A shared software library stored on machine readable media, comprising:
- a first set of one or more library functions for disclosing to trusted software modules; and
- a second set of one or more dummy library functions for trapping untrusted software modules.

19. The shared software library of claim 18, wherein a corresponding library function is disabled after a reference to the corresponding dummy library function.

20. The shared software library of claim 18, wherein the untrusted software modules are disabled after a reference to the corresponding dummy library function.

21. The shared software library of claim 18, wherein the dummy library function generates a system log event as result of a reference to the corresponding dummy library function.

22. The shared software library of claim 18, wherein the dummy library function generates a system administrator alert as result of a reference to the corresponding dummy library function.

23. A hardware processing system, comprising:
- a processor;
- an instruction translation table; and
- a module name translation table;
- wherein the processor fetches an instruction, decodes the instruction according to a translation stored in the translation table, and executes the decoded instruction, and wherein instruction calls to modules are translated according to the module name translation table.

24. A method for generating a web page, comprising the steps of:
- receiving a web page request having a first URL;
- translating the first URL to a second URL according to a URL translation table, the second URL indicating a first web page, the first web page having a third one or more embedded URLS; and
- generating a second web page;
- wherein the generating step comprises replacing the third one or more embedded URLS with translated versions of said third one or more embedded URLS according to the URL translation table to obtain the second web page.

25. The method of claim 24, wherein a reference any one or more third one or more embedded URLS before translation will generate a system administrator alert.

26. A method for processing a file access request, comprising the steps of:
- receiving a file access request having a first string; and
- translating the first string to a second string, the second string indicating a file name;
- wherein the translating step proceeds according to a file name translation table.

27. A method for providing access to a file system, comprising the steps of:
- receiving a file access request; and
- processing the request;
- wherein the file access request comprises a file name and a first file name extension, the processing step comprises translating the first file name extension to obtain a second file name extension and providing access to a file indicated by the file name and the second file name extension.

28. A method for processing a network packet, comprising the steps of:
- receiving a network packet, the network packet comprising a protocol type field having a first protocol type identifier;
- translating the first protocol type identifier to a second protocol type identifier; and routing the network packet according to a protocol indicated by the second protocol type identifier;

wherein the translating step proceeds according to a protocol type field translation table.

29. A method for processing a database command, comprising the steps of:

receiving a database command having a first command string; and translating the first command string to a second command string, the second command string indicating a database command keyword;

wherein the translating step proceeds according to a database command keyword translation table.

\* \* \* \* \*

UNITED STATES PATENT AND TRADEMARK OFFICE
CERTIFICATE OF CORRECTION

PATENT NO. : 7,464,408 B1 Page 1 of 1
APPLICATION NO. : 10/651588
DATED : December 9, 2008
INVENTOR(S) : Shah et al.

It is certified that error appears in the above-identified patent and that said Letters Patent is hereby corrected as shown below:

IN THE CLAIMS

At column 11, line 50, please replace "entrusted" with "untrusted" so that the corresponding claim reads --14. A computer system comprising: a processing module; a software program; and an operating system; the software program configured for running on the operating system, the operating system having a translated system call interface, the translated system call interface comprising a first set of translated system call names for disclosing to trusted parties, the translated system call interface further comprising a second set of dummy system call names untranslated system call names for trapping untrusted parties, the software program comprising:

a set of one or more instructions;

wherein the set of one or more instructions comprises one or more references to the first set of translated system call names.--

Signed and Sealed this

Seventeenth Day of February, 2009

JOHN DOLL
*Acting Director of the United States Patent and Trademark Office*